United States Patent Office.

HENRY H. EAMES, OF BALTIMORE COUNTY, MARYLAND, ASSIGNOR, BY DIRECT AND MESNE ASSIGNMENTS, TO THE EAMES PURIFYING AND SEPARATING COMPANY, OF WEST VIRGINIA.

PROCESS OF SEPARATING IRON FROM ORE.

SPECIFICATION forming part of Letters Patent No. 484,877, dated October 25, 1892.

Application filed April 6, 1889. Serial No. 306,224. (No specimens.)

*To all whom it may concern:*

Be it known that I, HENRY H. EAMES, residing in Baltimore County, in the State of Maryland, have invented a new and useful Method or Process of Extracting or Separating Iron from Gangues, Ores, or Sponges in which Said Iron Exists, of which the following is a full description.

A suitable apparatus for this purpose is shown and described in my application for Letters Patent therefor filed on the 14th day of May, 1888, and having the Serial No. 273,767.

In simple gangues or ores, as well as in complex varieties of the same, it is well known that different metals exist, some of which are held in combination with other constituent elements of the ores or gangues. When these metals exist in a state which will render them separable by mechanical means, my process will apply. I have also invented certain methods and apparatuses by which these simple and complex ores are freed from impurities, producing a sponge wherein are contained the metals in a pure or approximately-pure state. These sponges contain different metals in varying quantities, chiefly iron, but also gold, copper, silver, and other metals; and my invention consists in the method of separating these metals by picking out the iron upon conductors having a current of electricity passing through them and detaching these iron particles adhering to the conductors by breaking the current and allowing them to fall off upon the ground or into a receptacle for the purpose, so that they may be taken and applied to any uses to which they are applicable. My application, Serial No. 273,767, describes and claims an apparatus for this purpose, and consists, in short, of an endless belt or band to which motion is imparted. This band has along its surface a series of conducting-strips, and by means of a series of rollers above and below the band it is made to assume an undulating, corrugated, or serpentine form. This band is placed in an inclined position, so that the ores dropped thereon travel naturally upon an inclined corrugated plane. Means are also therein described and shown for imparting to the strips upon the band or passing therethrough an electric current. Upon this corrugated band the ores or gangues are dropped. The current passing through the conducting-strips crossing the same causes the particles of iron on the band to attach themselves to the conducting-strips. At the same time a stream of water is directed upon the band, which, being inclined, flows in the direction opposite to that in which the band is traveling, washing backwardly the gold or copper or other metal composing the gangue or sponge which do not adhere to the metal strips which continue to flow backwardly until washed off of the lower end of the band into a receptacle placed there to catch them. The iron particles continue to adhere to the strips and travel with them to the other end of the apparatus, when the circuit passing through the strips is broken and the iron particles fall off upon the ground or into a receptacle at that end and are caught and retained therein.

To further describe or explain my process, I take the gangues, ores, or sponges and grind or pulverize them, then pass a current of electricity through a copper wire or other conductor and bring this conductor in proximity to or in contact with the divided material, when the iron particles will attach themselves to the conductor. If the wire be then removed, the particles of iron will still adhere to it and immediately drop off when the current is broken. The same thing may be accomplished by placing the ground gangues in water into which a conductor is introduced, passing an electric current through the conductor, and stirring up the divided material. The particles of iron will adhere to the conductor, which may then be removed from the water, and when the current through the conductor is shut off the iron will drop therefrom.

It is easy to see how this principle can be multiplied and modified in various ways in machinery by causing conductors to be revolved in or passed through the divided material either dry or in water and when the iron particles are caught on the conductor and carried out to break the current and allow them to drop into a receptacle.

What I claim is—

1. The method or process of extracting iron from gangues, ores, or sponges containing it by grinding or otherwise dividing the material and bringing the same in contact with or proximity to a conductor through which a current of electricity is passing, whereby the iron particles therein are caused to adhere to the conductor.

2. The method or process of extracting or separating iron from gangues, ores, or sponges containing it by grinding or otherwise dividing the material, bringing the same in contact with or proximity to a conductor through which a current of electricity is passing, gathering the iron particles upon the conductor, and then detaching them by shutting off the current through the conductor.

HENRY H. EAMES.

Witnesses:
ROBT. A. BLAY,
MAGGIE TURNER.